June 14, 1949.    R. F. SHROPSHIRE    2,473,453
METHOD OF EXTRACTING OIL FROM FISH MATERIAL
Filed Oct. 4, 1946
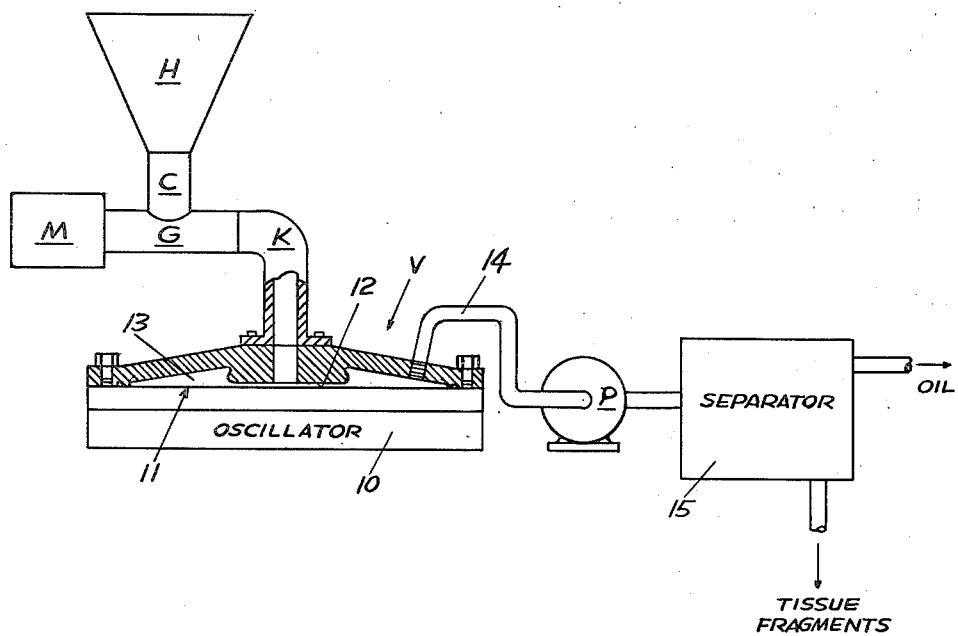
INVENTOR
RALPH F. SHROPSHIRE
BY
ATTORNEY

UNITED STATES PATENT OFFICE 2,473,453

METHOD OF EXTRACTING OILS FROM FISH MATERIAL

Ralph F. Shropshire, Cambridge, Mass., assignor to Submarine Signal Company, Boston, Mass., a corporation of Delaware Application October 4, 1946, Serial No. 701,067

7 Claims. (Cl. 260—412.1)

The present invention relates to a new product of manufacture, namely fish oil extract, and to a method of treating fish and fish livers in order to obtain therefrom desired oils, vitamins and other substances.

It has previously been proposed to treat the livers of certain fishes, for example, those of cod, salmon, halibut, whiting, tuna, etc., with heat, as by boiling or steaming, with or without the addition of various chemicals, and thereafter pressing the mass to remove the desired liver oils. On the other hand it has also been proposed to remove such oils at a low temperature, sometimes under a vacuum, by treating the livers with various solvents which usually include caustics to bring about the dissolution of the animal tissues and thereby liberate the oils.

The criteria which determine the desirability of any commercial process for this purpose involve, not only the yield of oil per unit weight of livers treated, but also the vitamin potency of the oil with especial reference to vitamin A; the taste, color and odor of the oil; its keeping quality, and the stability of the vitamin content.

It is an object of the present invention to provide a new method for the separating of oils, and especially vitamin-containing oils, from fish livers, fish fragments or whole fish with not only an increased yield per unit weight of material but also with increased vitamin potency and other improved qualities. It is a further object of the present invention to produce a fish oil extract as a new product of manufacture.

According to the present invention a quantity of fish livers or, if desired, fish fragments or whole fish are coarsely ground to produce a pulpy, more or less liquid mass. This material is subjected to compressional wave vibration at a high power level sufficient to produce cavitation within the liquid mass and thereby to bring about destruction of the cellular fish material. The frequency of the vibrations is not critical if the high power level condition be observed, but I prefer to use a frequency which is low in the audible spectrum. By this treatment, the desired liver oil is completely released from the liver tissues and can be removed from the treated material by any of the usual processes. Preferably, however, the separation of the oil is achieved mechanically without the addition of foreign substances. It should be noted that the vibrational treatment can be carried out at any temperature, but preferably at room temperature, or below that at which the desired vitamins and especially vitamin A and the stabilizing vitamin E are relatively stable; that is, the temperature should be maintained low enough to inhibit deterioration of the vitamin constituents of the oil.

The present method thus yields a new liver oil product which is characterized by an unusually high vitamin potency of great stability, and by other desirable medicinal properties. Moreover, the oil has a superior flavor and possesses a color and taste comparable to that of highly refined medicinal oils. Furthermore the oil prepared according to the present invention contains no contaminants. It also lacks the objectionable fishy odor and taste which is occasioned by many of the prior art processing methods which probably involve the carry-over into the oil of trimethylamine-like substances.

In carrying out my invention any suitable vibration apparatus may be employed provided a high power level compressional wave vibration can be obtained therewith. For the purpose of example, a vibratory equipment of the general type shown in U. S. Patent No. 2,138,051, issued November 29, 1938, to R. L. Williams, may be used. With such an equipment compressional wave vibration of any particular material need only be continued for a minute or less and preferably is carried out on a continuous basis whereby a ton of fish livers may be treated within an hour or two.

In order to carry out the present method on a continuous basis, the system shown in the accompanying drawing may be employed. A receptacle H for the whole fish, the fish fragments or fish livers is arranged with a conduit C to a grinder G, driven by a motor M, where the fish tissues are coarsely ground. From the grinder a conduit K is arranged through which the ground material is conducted to the vibrator V. The vibrator is of a form shown in Fig. 9 of the above identified Williams patent, and includes an oscillator 10, a diaphragm 11 actuated thereby, a nozzle 12 and a chamber 13. The ground tissues are introduced through the nozzle and the treated mixture of oil and residual tissue material is removed from the treatment chamber 13 via a conduit pipe 14. With this vibrator apparatus the ground fish material may be treated in such a manner as to subject all the material in a continuous flow to the action of compressional wave vibrations at a power level sufficient to disrupt the cell structure of the tissues. This power level is reached when cavitation occurs in the mixture being treated in the vibrator, as stated above.

The temperature need not be elevated during treatment, for the fish tissue cells are broken down at room temperatures, and below. From the output of the vibrator the treated material may be conducted by the conduit pipe 14 by gravity or with the aid of a pump P, as shown, if desired to a separator 15 which may be a filter, or preferably a centrifuge, capable of continuously separating the desired oil from the tissue fragments.

Having now described my invention, I claim:

1. The method of extracting oils from fish fragments which comprises reducing oil-bearing fish fragments to a pulpy mass, subjecting said mass to compressional wave energy at a power level which produces cavitation within said mass whereby the cell structure of the fish tissues is disrupted, thereafter separating the desired oil from the treated material.

2. The method of extracting oils from fish fragments which comprises reducing oil-bearing fish fragments to a pulpy mass, subjecting said mass, at about room temperature to compressional wave energy at a power level which produces cavitation within said mass whereby the cell structure of the fish tissues is disrupted, thereafter separating the desired oil from the treated material.

3. The method of extracting oils from fish fragments which comprises reducing oil-bearing fish fragments to a pulpy mass, subjecting said mass to compressional wave energy in the lower range of audible frequencies at a power level which produces cavitation within said mass whereby the cell structure of the fish tissues is disrupted, thereafter separating the desired oil from the treated material.

4. The method of extracting oils from fish livers which comprises reducing oil-bearing fish livers to a pulpy mass, subjecting said mass to compressional wave energy at a power level which produces cavitation within said mass whereby the cell structure of the fish livers is disrupted, thereafter separating the desired oil from the treated material.

5. The method of extracting oils from fish livers which comprises reducing oil-bearing fish livers to a pulpy mass, subjecting said mass at about room temperature to compressional wave energy at a power level which produces cavitation within said mass whereby the cell structure of the fish livers is disrupted, thereafter separating the desired oil from the treated material.

6. The method of extracting oils from fish fragments in a continuous process which comprises reducing oil-bearing fish fragments to a pulpy mass, continuously removing said mass as produced and subjecting said mass to compressional wave energy at a power level which produces cavitation within said mass whereby the cell structure of the fish tissues is disrupted, and thereafter continuously withdrawing the treated material and separating the desired oil from the treated material.

7. The method of extracting oils from fish fragments in a continuous process which comprises reducing oil-bearing fish fragments to a pulpy mass, continuously removing said mass as produced and subjecting said mass at about room temperature to compressional wave energy at a power level which produces cavitation within said mass whereby the cell structure of the fish tissues is disrupted, and thereafter continuously withdrawing the treated material and separating the desired oil from the treated material.

RALPH H. SHROPSHIRE.

REFERENCES CITED

The following references are of record in the file of this patent:

UNITED STATES PATENTS

| Number | Name | Date |
|---|---|---|
| 188,429 | Smith | Mar. 13, 1877 |
| 1,742,666 | Oive | Jan. 7, 1930 |
| 2,413,692 | Crowther | Jan. 7, 1947 |